US012196089B2

(12) United States Patent
Kondo et al.

(10) Patent No.: US 12,196,089 B2
(45) Date of Patent: Jan. 14, 2025

(54) MONITORING DEVICE, COMPUTER-READABLE STORAGE MEDIUM FOR STORING MONITORING PROGRAM AND MONITORING METHOD FOR ROTARY MACHINE, AND ROTARY MACHINE EQUIPMENT

(71) Applicant: MITSUBISHI HEAVY INDUSTRIES, LTD., Tokyo (JP)

(72) Inventors: Makoto Kondo, Tokyo (JP); Takehiko Yamaguchi, Tokyo (JP); Katsuhisa Hamada, Kanagawa (JP); Takashi Nakano, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/029,204

(22) PCT Filed: Nov. 8, 2021

(86) PCT No.: PCT/JP2021/040927
§ 371 (c)(1),
(2) Date: Mar. 29, 2023

(87) PCT Pub. No.: WO2022/102556
PCT Pub. Date: May 19, 2022

(65) Prior Publication Data

US 2024/0026800 A1 Jan. 25, 2024

(30) Foreign Application Priority Data

Nov. 10, 2020 (JP) ................................ 2020-186961

(51) Int. Cl.
*F01D 21/00* (2006.01)
*F01D 11/24* (2006.01)

(52) U.S. Cl.
CPC ............ *F01D 21/003* (2013.01); *F01D 11/24* (2013.01); *F05D 2220/31* (2013.01);
(Continued)

(58) Field of Classification Search
CPC ..................................................... F01D 21/003
See application file for complete search history.

(56) References Cited

U.S. PATENT DOCUMENTS 8,121,813 B2 * 2/2012 Ren .......................... G01B 7/14 702/155
10,458,342 B2 * 10/2019 Morgan .................... F02C 9/00
(Continued)

FOREIGN PATENT DOCUMENTS

JP 7-54606 2/1995
JP 2000-27606 1/2000
(Continued)

OTHER PUBLICATIONS

Naoyuki, JP2014040795A English Translation, 2014 (Year: 2014).*
(Continued)

*Primary Examiner* — Michael L Sehn
(74) *Attorney, Agent, or Firm* — Wenderoth, Lind & Ponack, L.L.P.

(57) ABSTRACT

A monitoring device for a rotary machine is a monitoring device for monitoring a clearance of a rotary machine including a casing for housing a rotating part and a stationary part, including: at least one position sensor disposed outside the casing and configured to detect a relative position of the casing to the rotating part in a radial direction; and an estimation unit configured to obtain an estimated value of an internal clearance between the rotating part and the stationary part in the casing, based on a measured value detected by the at least one position sensor.

13 Claims, 6 Drawing Sheets

(52) U.S. Cl.
CPC .... *F05D 2270/305* (2013.01); *F05D 2270/71* (2013.01); *F05D 2270/821* (2013.01)

(56) References Cited

U.S. PATENT DOCUMENTS

| | | | |
|---|---|---|---|
| 2008/0069683 | A1 | 3/2008 | Nigmatulin et al. |
| 2009/0053035 | A1 | 2/2009 | Zhang et al. |
| 2022/0235674 | A1 | 7/2022 | Kondo et al. |

FOREIGN PATENT DOCUMENTS

| | | |
|---|---|---|
| JP | 2009-52547 | 3/2009 |
| JP | 2014-40795 | 3/2014 |
| JP | 2016-169631 | 9/2016 |
| JP | 2021-42713 | 3/2021 |

OTHER PUBLICATIONS

International Search Report issued Dec. 28, 2021 in International Application No. PCT/JP2021/040927, with English translation.

International Preliminary Report on Patentability issued May 16, 2023 in International Application No. PCT/JP2021/040927, with English translation.

* cited by examiner

MONITORING DEVICE, COMPUTER-READABLE STORAGE MEDIUM FOR STORING MONITORING PROGRAM AND MONITORING METHOD FOR ROTARY MACHINE, AND ROTARY MACHINE EQUIPMENT

TECHNICAL FIELD

The present disclosure relates to a monitoring device, a computer-readable storage medium for storing a monitoring program and a monitoring method for a rotary machine, and a rotary machine equipment.

This application claims the priority of Japanese Patent Application No. 2020-186961 filed on Nov. 10, 2020, the content of which is incorporated herein by reference.

BACKGROUND

In a rotary machine such as a turbine, it is required to appropriately monitor a clearance between a rotating part (rotor) and a stationary part (casing etc.) in order to prevent contact between the rotating part and the stationary part.

Patent Document 1 discloses a rubbing maintenance device that includes gap sensors disposed at four locations on an outer circumference of a rotor in a gland part of a steam turbine. The device calculates a minimum radial clearance at the positions where the gap sensors are installed (gland part) based on detection results of the gap sensors, and uses the calculation result to monitor contact between the rotor and a stationary part at the gland part.

CITATION LIST

Patent Literature

Patent Document 1: JPH07-54606A

SUMMARY

Technical Problem

Meanwhile, in order to appropriately suppress contact between a rotating part and a stationary part in a casing of a rotary machine, it is desired to monitor a clearance between the rotating part and the stationary part inside the casing (hereinafter, also referred to as an internal clearance). However, since the device described in Patent Document 1 does not monitor the internal clearance, it may be impossible to appropriately suppress the contact between the rotating part and the stationary part in the casing. On the other hand, it is possible to measure the internal clearance by using a clearance sensor provided inside the casing. In this case, however, it is necessary to open the casing each time for installation or maintenance of the clearance sensor, increasing a cost for the installation or the maintenance. Further, the interior of the casing is in a high-temperature and high-pressure environment, and the clearance sensor is likely to malfunction, which may make it impossible to appropriately monitor the clearance.

In view of the above, an object of at least one embodiment of the present invention is to provide a monitoring device, a computer-readable storage medium for storing a monitoring program and a monitoring method for a rotary machine, and a rotary machine equipment which are capable of achieving both easy installation and management of a sensor and appropriate monitoring of the internal clearance of the rotary machine.

Solution to Problem

A monitoring device for a rotary machine according to at least one embodiment of the present invention is a monitoring device for monitoring a clearance of a rotary machine including a casing for housing a rotating part and a stationary part, including: at least one position sensor disposed outside the casing and configured to detect a relative position of the casing to the rotating part in a radial direction; and an estimation unit configured to obtain an estimated value of an internal clearance between the rotating part and the stationary part in the casing, based on a measured value detected by the at least one position sensor.

Further, a rotary machine equipment according to at least one embodiment of the present invention includes: a rotary machine including a casing for housing a rotating part and a stationary part; and the above-described monitoring device for monitoring a clearance of the rotary machine.

Furthermore, a computer-readable storage medium for storing a monitoring program for a rotary machine according to at least one embodiment of the present invention is a computer-readable storage medium for storing a monitoring program for monitoring a clearance of a rotary machine including a casing for housing a rotating part and a stationary part, the monitoring program being configured to cause a computer to implement: a procedure for receiving a signal indicating a measured value of a relative position of the casing to the rotating part in a radial direction detected by a position sensor disposed outside the casing; and a procedure for obtaining an estimated value of an internal clearance between the rotating part and the stationary part in the casing, based on the measured value.

Furthermore, a monitoring method for a rotary machine according to at least one embodiment of the present invention is a monitoring method for monitoring a clearance of a rotary machine including a casing for housing a rotating part and a stationary part, including: a step of detecting a relative position of the casing to the rotating part in a radial direction by using a position sensor disposed outside the casing; and a step of obtaining an estimated value of an internal clearance between the rotating part and the stationary part in the casing, based on a measured value detected by the position sensor.

Advantageous Effects

According to at least one embodiment of the present invention, provided are a monitoring device, a computer-readable storage medium for storing a monitoring program and a monitoring method for a rotary machine, and a rotary machine equipment which are capable of achieving both easy installation and management of a sensor and appropriate monitoring of an internal clearance of the rotary machine.

DETAILED DESCRIPTION

Figure 1:
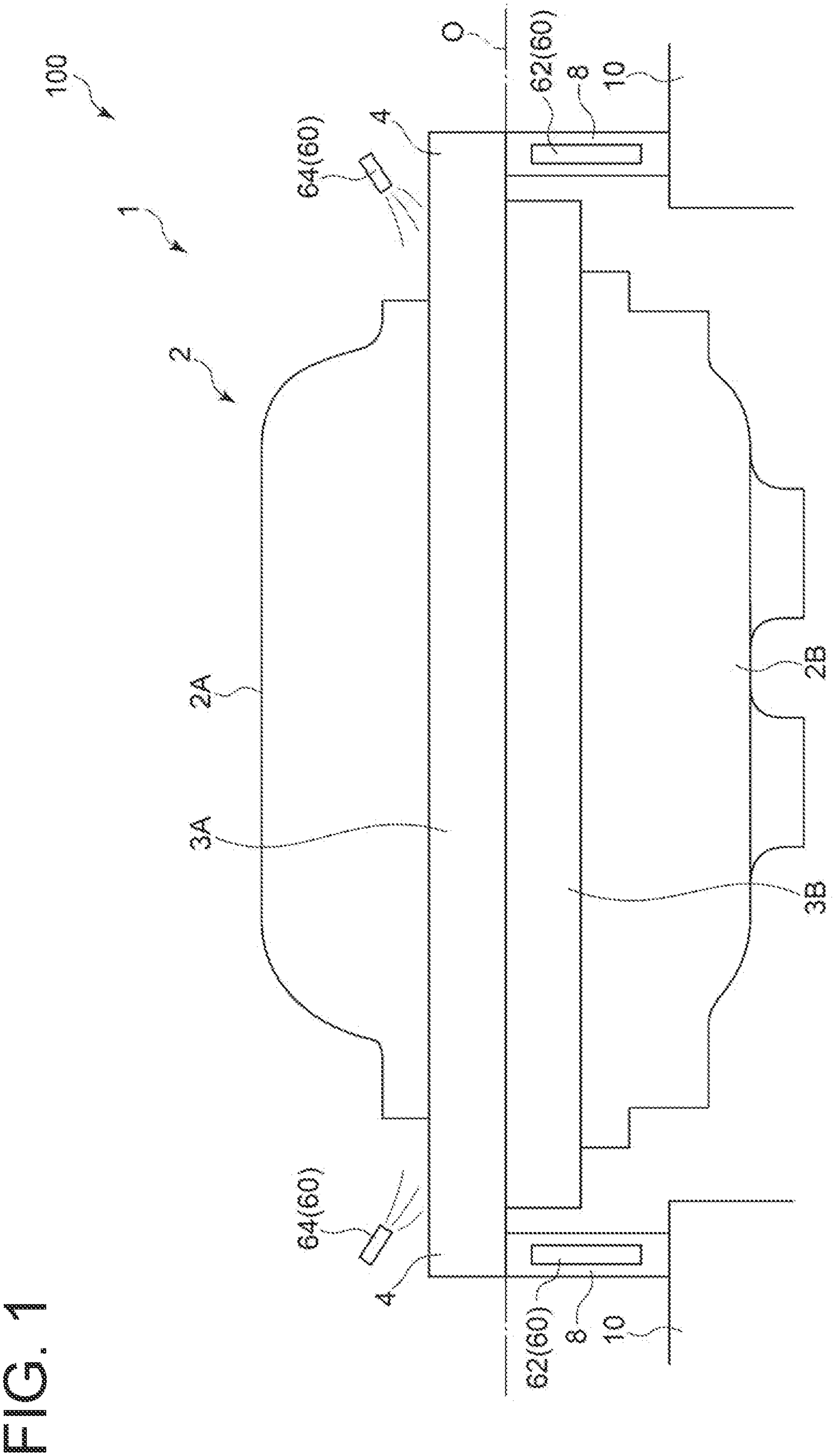
FIG. 1 is a schematic view of a rotary machine equipment including a steam turbine according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Hereinafter, a case will be described where a rotary machine constituting a rotary machine equipment according to some embodiments is a steam turbine. However, the rotary machine in the present invention is not limited to the steam turbine, but may be another rotary machine (for example, a gas turbine etc.).

(Configuration of Rotary Machine Equipment)

Figure 2:
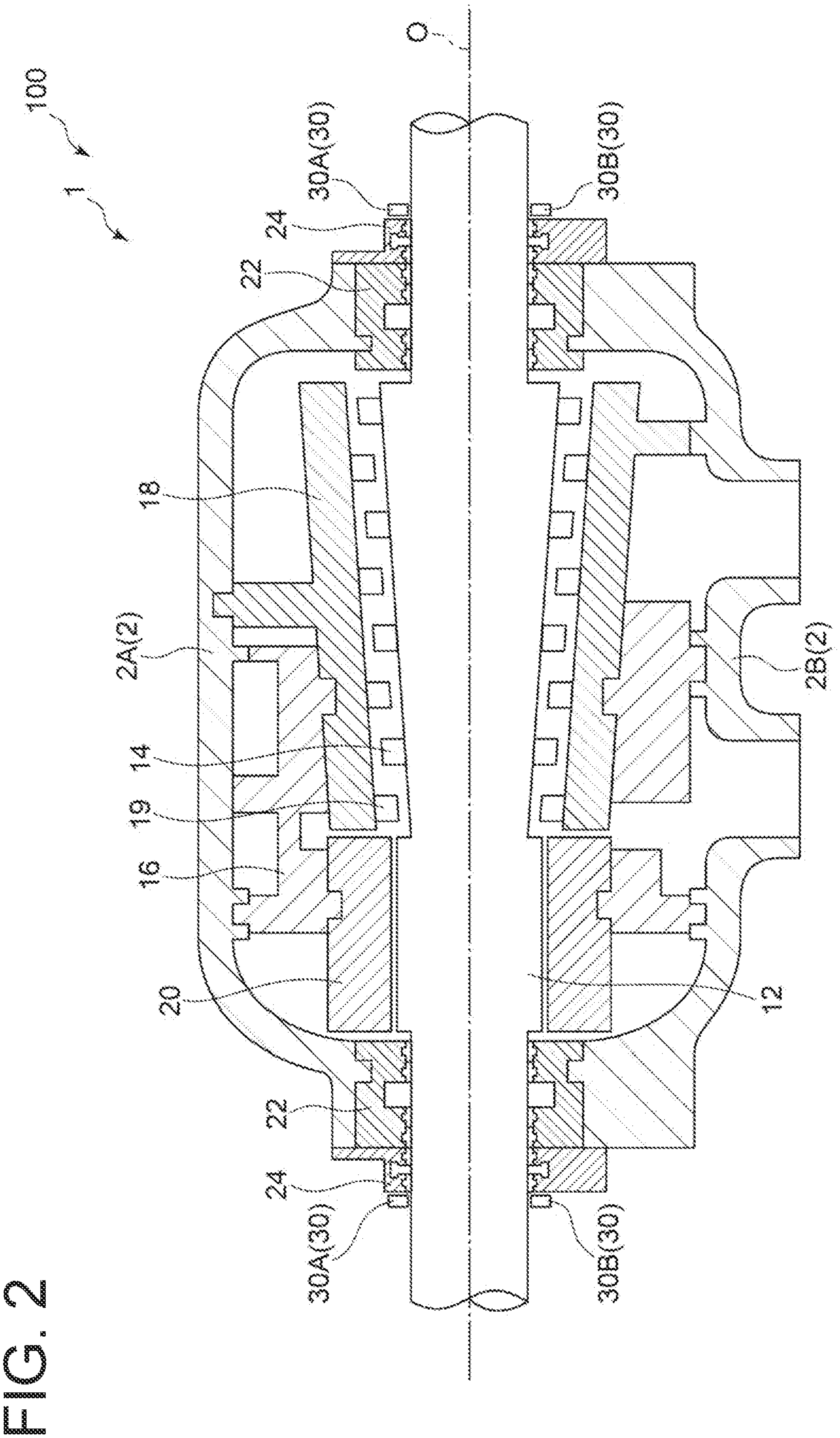
FIG. 2 is a schematic cross-sectional view of the steam turbine shown in FIG. 1.
Figure 3A:
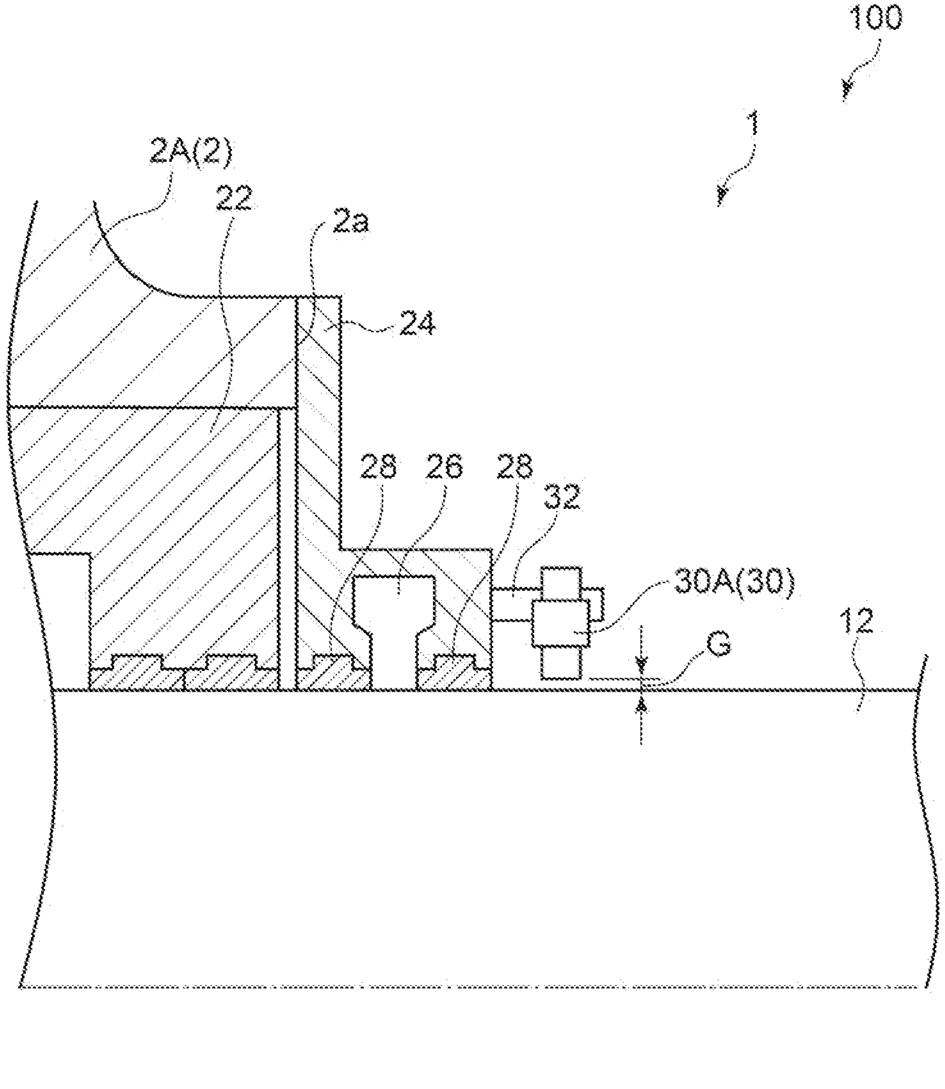
FIG. 3A is a partial enlarged view of FIG. 2.
Figure 3B:
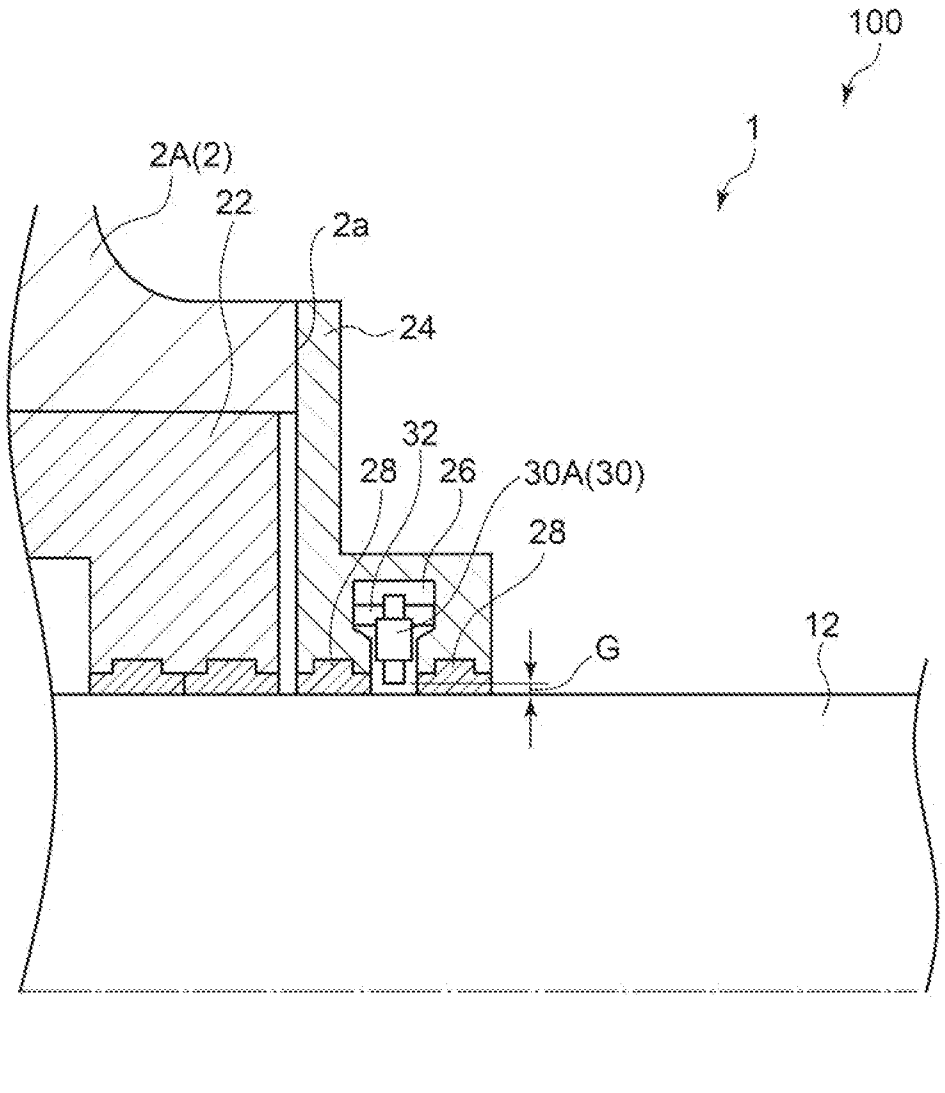
FIG. 3B is a partial cross-sectional view of the steam turbine according to another embodiment.
Figure 4:
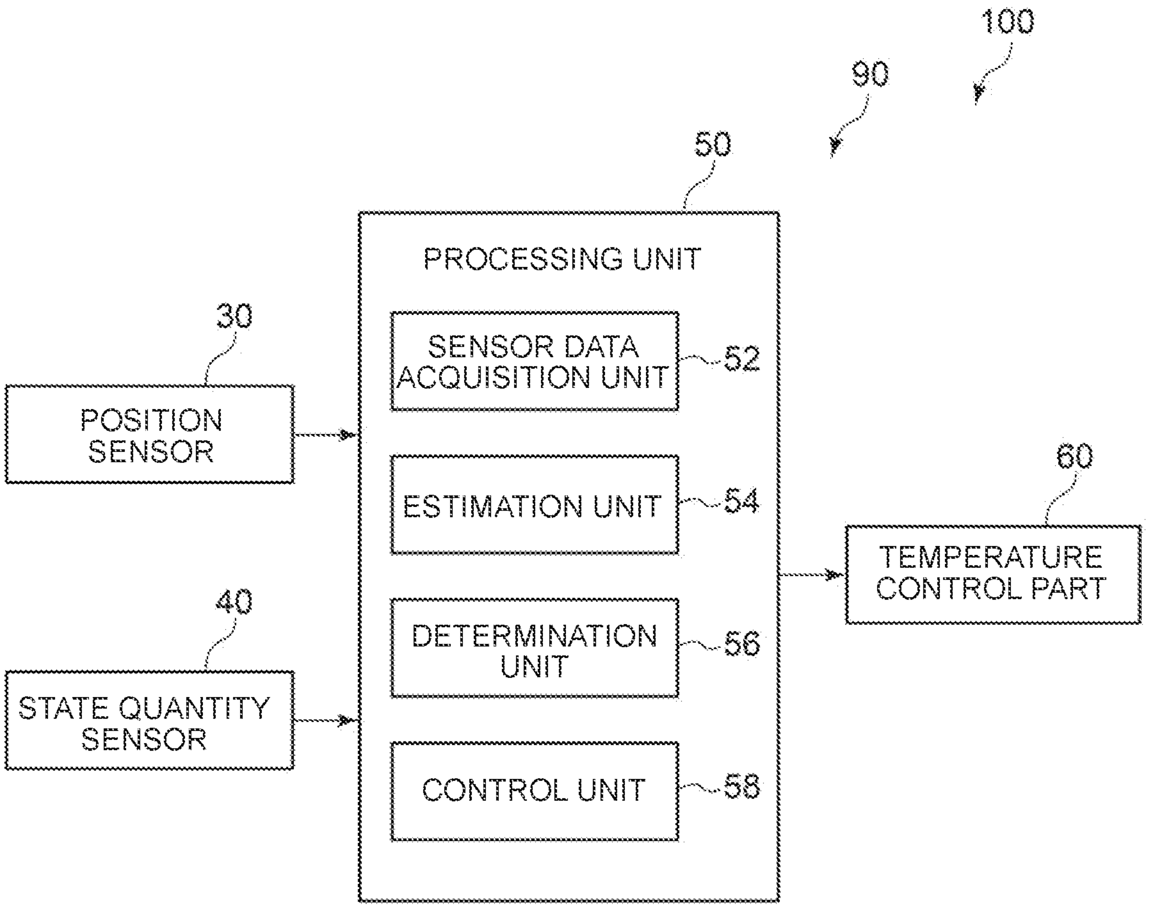
FIG. 4 is a schematic configuration diagram of a monitoring/control device according to an embodiment.

FIG. 1 is a schematic view of a rotary machine equipment including a steam turbine according to an embodiment, and FIG. 2 is a schematic cross-sectional view of the steam turbine shown in FIG. 1. FIGS. 3A and 3B are each a schematic cross-sectional view of an axial end of a casing of the steam turbine constituting the rotary machine equipment according to an embodiment. FIG. 3A is a partial view of FIG. 2, and FIG. 3B is a schematic cross-sectional view of the steam turbine according to another embodiment. FIG. 4 is a schematic configuration diagram of a monitoring/control device according to an embodiment.

A rotary machine equipment 100 according to some embodiments includes a steam turbine (rotary machine) 1 (see FIGS. 1 to 3B), and a monitoring/control device 90 (see FIG. 4) for monitoring and/or controlling a clearance between a rotating part and a stationary part of the steam turbine 1.

(Configuration of Steam Turbine (Rotary Machine))

As shown in FIGS. 1 and 2, the steam turbine 1 includes a rotor 12 (not shown in FIG. 1) rotatable around a central axis O, and an outer casing (casing) 2 for housing the rotating part including the rotor 12 and the stationary part.

The outer casing 2 is configured to separate a space at atmospheric pressure and a space at a pressure higher or lower than atmospheric pressure. The outer casing 2 includes a casing upper half portion 2A located on the upper side and a casing lower half portion 2B located on the lower side in the up-down direction (that is, the vertical direction), and an upper flange portion 3A disposed in the casing upper half portion 2A and a lower flange portion 3B disposed in the casing lower half portion 2B are fastened with a bolt (not shown).

The outer casing 2 is supported by a support pedestal 8 fixed to a foundation 10. In the illustrated embodiment, the casing upper half portion 2A includes support leg portions 4 projecting in the axial direction (a direction of the central axis O of the rotor), and is supported by the support pedestal 8 via the support leg portions 4. In the outer casing 2 shown in FIG. 1, the casing upper half portion 2A is provided with, at each of both ends in the axial direction, a pair of support leg portions 4 on both sides of the central axis O in a plan view, that is, provided with a total of four support leg portions 4.

As shown in FIG. 2, the rotating part housed in the outer casing 2 includes the rotor 12 rotatably supported by a bearing (not shown), and a plurality of rotor blades 14 disposed in the rotor 12 so as to radially project from the rotor 12. As shown in FIG. 2, the rotor 12 is disposed so as to penetrate the outer casing 2. In the exemplary embodiment shown in FIG. 2, the rotor 12 is provided with multiple stages of rotor blades 14 that are axially spaced apart.

As shown in FIG. 2, stationary parts housed in the outer casing 2 include an inner casing 16 supported by the outer casing 2, a blade ring 18 supported by the inner casing 16, stator vanes 19 and a dummy ring 20, and inner gland parts 22 disposed at both ends of the outer casing 2 in the axial direction. The stator vanes 19 are supported by the inner casing 16 via the blade ring 18 and are disposed so as to be located upstream of the rotor blades 14 of each stage in the axial direction.

Inside the outer casing 2, there is a clearance between the rotating part and the stationary part in the radial direction. In the present specification, the radial clearance between the rotating part and the stationary part inside the outer casing 2 (casing) is referred to as an internal clearance. The internal clearance is, for example, a clearance between a tip of the rotor blade 14 and the blade ring 18, a clearance between the rotor 12 and a tip of the stator vane 19, a clearance between the rotor 12 and a seal fin (not shown) disposed in the dummy ring 20, or the like.

As shown in FIGS. 2 to 3B, at the ends of the outer casing 2 in the axial direction, provided are outer gland parts 24 for suppressing fluid leakage from the inside to the outside of the outer casing 2 or air intrusion from the outside to the inside of the outer casing 2. The outer gland part 24 is mounted on an axial end surface 2*a* of the outer casing 2, thereby closing an open portion at the axial end of the outer casing 2. The outer gland part 24 includes a steam chamber 26 supplied with gland steam, and a gland packing 28 disposed facing the rotor 12.

In some embodiments, the rotary machine equipment 100 includes temperature control parts 60 for heating or cooling at least a portion of the outer casing 2 or the support pedestal 8. By heating or cooling at least a portion of the outer casing 2 or the support pedestal 8 with the temperature control parts 60, it is possible to adjust the amount of thermal expansion of the outer casing 2 or the support pedestal 8, making it possible to adjust the shape or the position of the outer casing 2. Therefore, by appropriately adjusting the shape or the position of the outer casing 2 with the temperature control parts 60, the internal clearance of the steam turbine 1 can be maintained in an appropriate range.

In an embodiment, for example, as shown in FIG. 1, the temperature control parts 60 include heating parts 62 for heating the support pedestal 8 for supporting the outer casing 2, and cooling parts 64 for cooling the support leg portions 4 of the outer casing 2. In this case, by heating the support pedestal 8 with the heating parts 62, the support pedestal 8 thermally expands in the vertical direction and the position of the outer casing 2 is changed such that the outer casing 2 is lifted. On the other hand, by cooling the support leg portions 4 with the cooling parts, the outer casing 2 is deformed such that the outer casing 2 sinks.

The heating parts 62 may be heaters configured to generate heat by using electrical energy. In the exemplary embodiment shown in FIG. 1, the heating parts 62 include panel-shaped heaters disposed on the surface of the support pedestal 8 for supporting the support leg portions 4.

The cooling parts 64 may be configured to supply a cooling fluid to the support leg portions 4. In the exemplary embodiment shown in FIG. 1, the cooling parts 64 include nozzles configured to eject air as a cooling fluid toward the support leg portions 4.

(Configuration of Monitoring/Control Device)

The monitoring/control device (monitoring device) 90 includes at least one position sensor 30 disposed outside the outer casing, and a processing unit 50 for receiving and processing a signal from the position sensor 30. The monitoring/control device 90 may further include a state quantity sensor 40 (not shown in FIGS. 1 to 3B) for measuring a state quantity indicating the state of the steam turbine 1.

The position sensor 30 is configured to detect a relative position of the outer casing 2 to the rotating part of the steam turbine 1 in the radial direction, at a position outside the outer casing 2.

A temperature at the position outside the outer casing 2 where the position sensor is disposed (that is, a position near the outer gland part 24) is approximately 100° C. On the other hand, the inside of the outer casing 2 is at a relatively high temperature of approximately 300° C. to 500° C. Further, since the outer gland part 24 is cooled by the gland steam, the temperature outside the outer casing 2 is relatively constant.

In some embodiments, for example, as shown in FIG. 3A, the position sensor 30 may be disposed in contact with atmospheric pressure.

In some embodiments, for example, as shown in FIGS. 3A and 3B, the position sensor 30 is supported by the outer casing 2 or a member mounted to the outer casing 2 and is disposed so as to face the rotor 12 at the position outside the outer casing 2.

In the exemplary embodiment shown in FIG. 3A, the position sensor 30 is disposed outside the outer gland part 24 and supported by the outer gland part 24 via a support member 32. In this case, the position sensor 30 contacts atmospheric pressure. In the exemplary embodiment shown in FIG. 3B, the position sensor 30 is disposed in the outer gland part 24 and supported by the outer gland part 24 via the support member 32. In this case, the position sensor 30 contacts a pressure between a gland steam pressure and atmospheric pressure.

The position sensor 30 is configured to detect a radial distance G (see FIGS. 3A and 3B) between the position sensor 30 and the rotor 12 facing the position sensor 30. Thus detected is the relative position of the outer casing 2 to the rotor 12 (rotating part) in the radial direction at the mounting position (the position outside the outer casing 2) of the position sensor 30.

The position sensor 30 may be a non-contact gap sensor, and may be, for example, an eddy current sensor, a capacitive sensor, or an optical sensor.

In an embodiment, the surface of the rotor 12 facing the position sensor 30 has the same diameter over the entire circumferential area of the rotor 12. Further, in an embodiment, the diameter of the rotor 12 facing the position sensor 30 is the same as the diameter of the rotor 12 in the outer gland part 24.

Hereinafter, the above-described relative position (or the distance G) detected by the position sensor 30 will be referred to as an external clearance for convenience.

In the exemplary embodiment shown in FIG. 2, the at least one position sensor 30 includes an upper sensor 30A for detecting the above-described relative position (external clearance) at the top of the rotor 12, and a lower sensor 30B for detecting the above-described relative position (external clearance) at the bottom of the rotor 12. Thus, by using a detection result of the above-described relative position (external clearance) in each of the upper sensor 30A and the lower sensor 30B disposed at the top and bottom of the rotor 12, it is possible to improve estimation accuracy of the internal clearance estimated by an estimation unit 54 (processing unit 50) described later.

Further, in some embodiments, the at least one position sensor 30 includes a pair of position sensors 30 disposed on the both sides of the outer casing 2 in the axial direction. In the exemplary embodiment shown in FIG. 2, the at least one position sensor 30 includes a pair of upper sensors 30A and a pair of lower sensors 30B disposed on the both sides of the outer casing 2 in the axial direction. Thus, by using a detection result of the above-described relative position (external clearance) in each of the pair of position sensors 30 disposed on the both sides of the rotor 12 in the axial direction, it is possible to improve estimation accuracy of the internal clearance estimated by the estimation unit 54 (processing unit 50) described later.

The detection result of the state quantity by the state quantity sensor 40 is used to calculate an estimated value of the internal clearance in the estimation unit 54 (processing unit described later. The state quantity sensor 40 may include, for example, at least one of a temperature sensor for measuring an inlet steam temperature of the steam turbine 1, a pressure sensor for measuring an inlet pressure, a temperature sensor for measuring an outlet steam temperature, a pressure sensor for measuring an outlet pressure, a rotation speed sensor for measuring a rotation speed of the rotor 12, a temperature sensor for measuring a surface temperature of the rotor 12, or a temperature sensor for measuring a temperature of the casing (the outer casing 2 etc.).

The processing unit 50 is configured to receive and process a signal from the position sensor 30 and/or the state quantity sensor 40. As shown in FIG. 4, the processing unit 50 includes a sensor data acquisition unit 52, the estimation unit 54, a determination unit 56, and a control unit 58.

The sensor data acquisition unit 52 is configured to receive a signal indicating a measured value by each sensor from the position sensor 30 and/or the state quantity sensor 40.

The estimation unit 54 is configured to obtain the estimated value of the internal clearance between the rotating part and the stationary part in the outer casing 2 based on the measured value detected by the position sensor 30 (the signal received by the sensor data acquisition unit 52).

The determination unit 56 is configured to determine whether to change the shape or the position of the outer casing 2, based on the estimated value of the internal clearance by the estimation unit 54.

When the determination unit 56 determines that the shape or the position of the outer casing 2 needs to be changed, the control unit 58 is configured to change the shape or the position of the outer casing 2 such that the internal clearance falls within a specified range. The control unit 58 may be configured to control the temperature control parts 60 such that the above-described internal clearance falls within the specified range, for example.

The processing unit 50 may include a calculator with a processor (such as CPU), a storage device (memory device; such as RAM), an auxiliary storage part, an interface, and the like. The processing unit 50 is configured to receive the signal from the position sensor 30 and/or the state quantity sensor 40 described above via the interface. The processor is configured to process the signal thus received. In addition, the processor is configured to process programs loaded into the storage device. Whereby, the function of each functional unit (such as the estimation unit 54) described above is realized.

The processing contents in the processing unit 50 may be implemented as programs executed by the processor. The programs may be stored in the auxiliary storage part. When executed, these programs are loaded into the storage device. The processor reads out the programs from the storage device to execute instructions included in the programs.

In the monitoring/control device (monitoring device) 90 having the above configuration, since the position sensor 30 for detecting the relative position of the casing to the rotating part in the radial direction is disposed outside the outer casing 2 of the steam turbine (rotary machine) 1, installation or management of the position sensor 30 can be facilitated compared to a case where the position sensor is disposed inside the outer casing 2. That is, it is possible to install/replace the position sensor 30 or to check the accuracy of the position sensor 30 without opening the outer casing 2. Further, compared to the case where the position sensor is disposed inside the outer casing 2 in a high-temperature and high-pressure environment, the position sensor 30 is less likely to malfunction. Furthermore, in the monitoring/control device (monitoring device) 90 having the above configuration, since the estimated value of the internal clearance of the steam turbine 1 is obtained based on the detection result of the above-described relative position (external clearance) by the position sensor 30, the internal clearance of the steam turbine 1 can appropriately be monitored based on the estimated value. Whereby, for example, it is possible to effectively suppress the contact between the rotating part and the stationary part. Accordingly, with the above-described monitoring/control device (monitoring device) 90, it is possible to achieve both easy installation and management of the position sensor 30 and appropriate monitoring of the internal clearance of the steam turbine 1.

(Monitoring/Control Flow for Rotary Machine)

Next, a flow of a method for monitoring/controlling the steam turbine (rotary machine) 1 according to some embodiments will be described. Hereinafter, a case will be described in which the rotary machine is monitored/controlled by using the above-described monitoring/control device 90. However, a part or a whole of a procedure described below may be performed manually.

Figure 5:
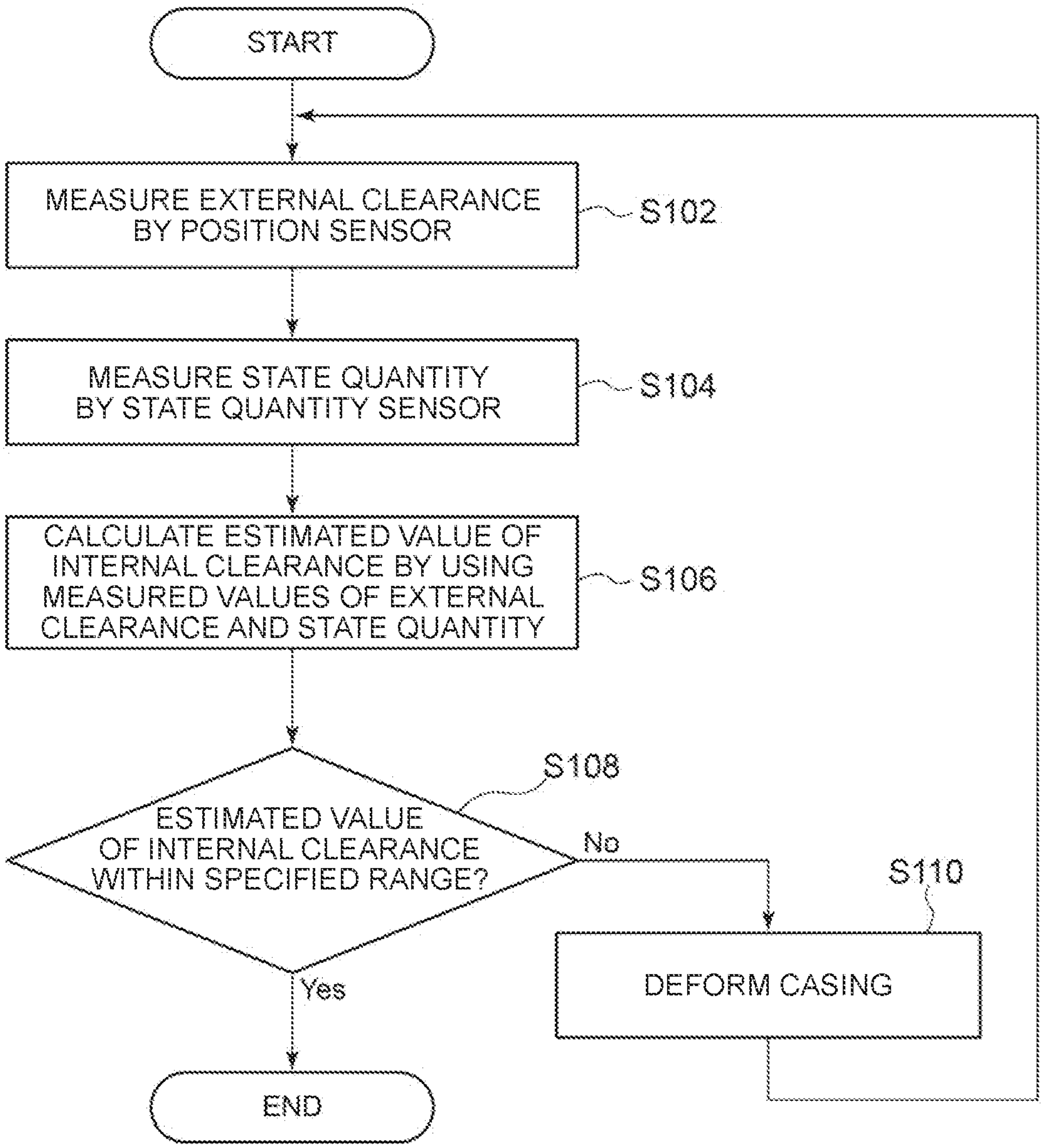
FIG. 5 is a flowchart of a monitoring/control method for a rotary machine according to an embodiment.

FIG. 5 is a flowchart of the monitoring/control method for the rotary machine according to an embodiment. In an embodiment, first, the relative position (external clearance) of the outer casing 2 to the rotating part of the steam turbine 1 in the radial direction is measured by using the above-described position sensor 30 (S102). Further, the state quantity indicating the state of the steam turbine 1 is acquired by using the above-described state quantity sensor 40 (S104). Herein, the state quantity includes, for example, at least one of the inlet steam temperature, the inlet pressure, the outlet steam temperature, the outlet pressure of the steam turbine 1, the rotation speed of the rotor 12, the surface temperature of the rotor 12, or the temperature of the casing (outer casing 2 etc.).

The execution order of steps S102 and S104 described above is not limited. That is, steps S102 and S104 may be performed in any order, or steps S102 and S104 may be performed simultaneously.

Next, the estimation unit 54 calculates the estimated value of the internal clearance between the rotating part and the stationary part in the outer casing 2 based on the measured value of the external clearance obtained in step S102 (S106). In step S106, the estimated value of the internal clearance described above may be calculated based on the measured value of the external clearance obtained in step S102 and the measured value of the state quantity obtained in step S104.

In step S106, the estimated value of the internal clearance may be calculated at each of a plurality of positions in the circumferential direction. For example, the estimated value of the internal clearance at the top of the rotor 12 and/or the estimated value of the internal clearance at the bottom of the rotor 12 may be acquired In step S106, the estimated value of the internal clearance may be calculated at each of a plurality of positions in the axial direction. For example, the estimated values of the clearance between the blade ring 18 and the tip of each of the multiple stages of rotor blades 14 and/or the clearance between the rotor 12 and the tip of each of the multiple stages of stator vanes 19, and/or the clearance between the rotor 12 and each of a plurality of seal fins disposed in the dummy ring 20 may respectively be calculated.

Some examples of a method for estimating the internal clearance in step S106 will be described later.

Next, the determination unit 56 is configured to determine whether to change the shape or the position of the outer casing 2, based on the estimated value of the internal clearance obtained in step S106.

In step S108, for example, when the estimated value of the internal clearance is within the specified range (within an appropriate range), the determination unit 56 determines that the shape or the position of the outer casing 2 need not be changed (Yes in S108). In this case, this flow is ended as it is. On the other hand, when the estimated value of the internal clearance is out of the specified range (out of the appropriate range), the determination unit 56 determines that the shape or the position of the outer casing 2 needs to be changed (No in S108). In this case, the process proceeds to step S110.

In step S110, the shape or the position of the outer casing 2 is changed such that the internal clearance falls within the specified range. In step S110, the control unit 58 may appropriately control the temperature control parts 60 (the heating parts 62 and the cooling parts 64) such that the outer casing 2 has a desired shape or position.

For example, if it is determined in step S108 that the estimated value of the internal clearance at the top of the rotor 12 is smaller than the specified range, in step S110, by heating the support pedestal 8 with the heating parts 62, the amount of thermal expansion of the support pedestal 8 may be adjusted and the position of the outer casing 2 may be changed such that the outer casing 2 is lifted. Alternatively, if it is determined in step S108 that the estimated value of the internal clearance at the bottom of the rotor 12 is smaller than the specified range, in step S110, by supplying the cooling fluid to the support leg portions 4 with the cooling parts 64, the outer casing 2 may be deformed so as to sink.

The procedure of steps S102 to S110 may be repeated until the estimated value of the internal clearance falls within the specified range.

(Estimation Method for Internal Clearance)

In step S106, for example, with a method described below, the estimated value of the internal clearance may be acquired by using the measured value of the external clearance.

For example, in step S106, the estimated value of the internal clearance may be acquired by simple estimation based on the state quantity of the steam turbine 1. In this case, first, based on the measured value of the state quantity of the steam turbine 1 acquired in step S104, provisional estimated values (temporary estimated values) of the internal clearance and the external clearance are calculated by simple estimation that uses an estimation equation or the like acquired in advance. The above-described estimation equation is an equation expressing the relationship between the state quantity of the steam turbine 1 and the internal/external clearance. Then, based on the measured value of the external clearance acquired in step S102 and the provisional estimated value of the external clearance described above, the estimated value of the internal clearance is acquired by correcting the provisional estimated value of the internal clearance described above. For example, the estimated value of the internal clearance may be acquired by acquiring a difference between the measured value of the external clearance and the provisional estimated value of the external clearance, and adding this difference to the provisional estimated value of the internal clearance described above.

Alternatively, in step S106, the estimated value of the internal clearance may be acquired with numerical analysis by Finite Element Method (FEM) or an analysis method that simplifies the model of the finite element method (Model Order Reduction; MOR). In this case, first, using the measured value of the state quantity of the steam turbine 1 acquired in step S104 as an input (boundary condition), the provisional estimated values (temporary estimated values) of the internal clearance and the external clearance are calculated by the method of FEM or MOR. Then, based on the measured value of the external clearance acquired in step S102 and the provisional estimated value of the external clearance described above, the estimated value of the internal clearance is acquired by correcting the provisional estimated value of the internal clearance described above. For example, the estimated value of the internal clearance may be acquired by acquiring a difference between the measured value of the external clearance and the provisional estimated value of the external clearance, and adding this difference to the provisional estimated value of the internal clearance described above.

Alternatively, in step S106, the estimated value of the internal clearance may be acquired by using an estimation model, through analysis using artificial intelligence (AI) such as machine learning. This estimation model is an estimation model that takes the state quantity of the steam turbine 1 and the external clearance as inputs and takes the internal clearance of the steam turbine 1 as an output. In this case, the estimated value of the internal clearance is acquired by using the measured value of the external clearance acquired in step S102 and the measured value of the state quantity of the steam turbine 1 acquired in step S104 as the inputs of the above-described estimation model and with the calculation result using the estimation model being the output. Note that the above-described estimation model may be a learned estimation model that has already been machine-learned by using teacher data.

The contents described in the above embodiments would be understood as follows, for instance.

(1) A monitoring device (such as the above-described monitoring/control device 90) for a rotary machine (such as the above-described steam turbine 1) according to at least one embodiment of the present invention is a monitoring device for monitoring a clearance of a rotary machine including a casing (such as the above-described outer casing 2) for housing a rotating part and a stationary part, including: at least one position sensor (30) disposed outside the casing and configured to detect a relative position of the casing to the rotating part in a radial direction; and an estimation unit (54) configured to obtain an estimated value of an internal clearance between the rotating part and the stationary part in the casing, based on a measured value detected by the at least one position sensor.

In the above configuration (1), since the position sensor for detecting the relative position of the casing to the rotating part in the radial direction is disposed outside the casing of the rotary machine, installation or management of the position sensor can be facilitated compared to the case where the position sensor is disposed inside the casing. Further, in the above configuration (1), since the estimated value of the internal clearance of the rotary machine is obtained based on the detection result of the above-described relative position by the position sensor, the internal clearance of the rotary machine can appropriately be monitored based on the estimated value. Whereby, for example, it is possible to effectively suppress the contact between the rotating part and the stationary part. Accordingly, with the above configuration (1), it is possible to achieve both easy installation and management of the position sensor and appropriate monitoring of the internal clearance of the rotary machine.

(2) In some embodiments, in the above configuration (1), the rotary machine includes an outer gland part disposed at an end of the casing in an axial direction, and the position sensor is supported by the outer gland part.

With the above configuration (2), since the position sensor is disposed so as to be supported by the outer gland part, installation or management of the position sensor can be facilitated.

(3) In some embodiments, in the above configuration (1) or (2), the at least one position sensor includes a pair of position sensors disposed on both sides of the casing in an axial direction.

With the above configuration (3), since a pair of position sensors are disposed on the both sides of the casing in the axial direction, the internal clearance can be estimated more appropriately than in the case where the position sensor is disposed only on one side of the casing.

(4) In some embodiments, in any one of the above configurations (1) to (3), the estimation unit is configured to calculate the estimated value of the internal clearance, based on a state quantity indicating a state of the rotary machine and the measured value obtained by the position sensor.

With the above configuration (4), the estimated value of the internal clearance can appropriately be calculated based on the state quantity indicating the state of the rotary machine and the measured value acquired by the position sensor. Thus, it is possible to appropriately monitor the internal clearance of the rotary machine based on the calculated estimated value.

(5) In some embodiments, in any one of the above configurations (1) to (3), the estimation unit is configured to calculate the estimated value of the internal clearance with an estimation model that uses a state quantity indicating a state of the rotary machine and the measured value obtained by the position sensor as inputs.

With the above configuration (5), the estimated value of the internal clearance can appropriately be calculated with the estimation model that uses the state quantity indicating the state of the rotary machine and the measured value obtained by the position sensor as the inputs. Thus, it is possible to appropriately monitor the internal clearance of the rotary machine based on the calculated estimated value.

(6) In some embodiments, in the above configuration (4) or (5), the estimation unit is configured to acquire the estimated value of the internal clearance by calculating a provisional estimated value of the internal clearance and a provisional estimated value of the relative position from the state quantity indicating the state of the rotary machine, and adding a difference between the measured value obtained by the position sensor and the provisional estimated value of the relative position to the provisional estimated value of the internal clearance.

With the above configuration (6), since the estimated value of the internal clearance is acquired by adding the difference between the measured value and the provisional estimated value of the relative position (that is, the external clearance) of the casing to the rotating part in the radial direction to the provisional estimated value of the internal clearance, it is possible to appropriately calculate the estimated value of the internal clearance. Thus, it is possible to appropriately monitor the internal clearance of the rotary machine based on the calculated estimated value.

(7) In some embodiments, in any one of the above configurations (1) to (6), the monitoring device for the rotary machine includes: a determination unit (56) configured to determine whether to change a shape or a position of the casing, based on the estimated value of the internal clearance.

With the above configuration (7), it is possible to appropriately determine whether to change the shape or the position of the casing, based on the estimated value of the internal clearance. For example, when the estimated value of the internal clearance is out of the specified range, it is possible to determine that the shape or the position of the casing is changed. Thus, by appropriately changing the shape or the position of the casing based on this determination result, it is possible to effectively suppress the contact between the rotating part and the stationary part.

(8) A rotary machine equipment (100) according to at least one embodiment of the present invention, includes: a rotary machine (such as the above-described steam turbine 1) including a casing for housing a rotating part and a stationary part; and the monitoring device (such as the above-described monitoring/control device 90) according to any one of the above (1) to (7) for monitoring a clearance of the rotary machine.

In the above configuration (8), since the position sensor for detecting the relative position of the casing to the rotating part in the radial direction is disposed outside the casing of the rotary machine, installation or management of the position sensor can be facilitated compared to the case where the position sensor is disposed inside the casing. Further, in the above configuration (8), since the estimated value of the internal clearance of the rotary machine is obtained based on the detection result of the above-described relative position by the position sensor, the internal clearance of the rotary machine can appropriately be monitored based on the estimated value. Whereby, for example, it is possible to effectively suppress the contact between the rotating part and the stationary part. Accordingly, with the above configuration (8), it is possible to achieve both easy installation and management of the position sensor and appropriate monitoring of the internal clearance of the rotary machine.

(9) In some embodiments, in the above configuration (8), the monitoring device includes a determination unit (56) configured to determine whether to change a shape or a position of the casing, based on the estimated value of the internal clearance, and the rotary machine equipment includes a control unit (58) configured to change the shape or the position of the casing such that the internal clearance falls within a specified range, when the determination unit determines that the shape or the position of the casing needs to be changed.

With the above configuration (9), when the determination unit determines that the shape or the position of the casing needs to be changed, the control unit can change the shape or the position of the casing such that the internal clearance falls within the specified range. Thus, by appropriately changing the shape or the position of the casing based on the determination result of the determination unit, it is possible to effectively suppress the contact between the rotating part and the stationary part.

(10) In some embodiments, in the above configuration (9), the control unit is configured to control a temperature control part (60) for heating or cooling at least a portion of the casing or a support pedestal for supporting the casing, such that the internal clearance falls within the specified range.

With the above configuration (10), when the determination unit determines that the shape or the position of the casing needs to be changed, the temperature control part is controlled to heat or cool the at least a portion of the casing such that the internal clearance falls within the specified range. Thus, it is possible to effectively suppress the contact between the rotating part and the stationary part.

(11) A computer-readable storage medium for storing a monitoring program for a rotary machine (such as the above-described steam turbine 1) according to at least one embodiment of the present invention is a computer-readable storage medium for storing a monitoring program for monitoring a clearance of a rotary machine including a casing (such as the above-described outer casing 2) for housing a rotating part and a stationary part, the monitoring program being configured to cause a computer (such as the above-described processing unit 50) to implement: a procedure for receiving a signal indicating a measured value of a relative position of the casing to the rotating part in a radial direction detected by a position sensor disposed outside the casing; and a procedure for obtaining an estimated value of an internal clearance between the rotating part and the stationary part in the casing, based on the measured value.

In the above program stored in the storage medium (11), since the position sensor for detecting the relative position of the casing to the rotating part in the radial direction is disposed outside the casing of the rotary machine, installation or management of the position sensor can be facilitated compared to the case where the position sensor is disposed inside the casing. Further, in the above program stored in the storage medium (11), since the estimated value of the internal clearance of the rotary machine is obtained based on the detection result of the above-described relative position by the position sensor, the internal clearance of the rotary machine can appropriately be monitored based on the estimated value. Whereby, for example, it is possible to effectively suppress the contact between the rotating part and the stationary part. Accordingly, with the above program stored in the storage medium (11), it is possible to achieve both easy installation and management of the position sensor and appropriate monitoring of the internal clearance of the rotary machine.

(12) A monitoring method for a rotary machine (such as the above-described steam turbine 1) according to at least one embodiment of the present invention is a monitoring method for monitoring a clearance of a rotary machine including a casing (such as the above-described outer casing 2) for housing a rotating part and a stationary part, including: a step (S102) of detecting a relative position of the casing to the rotating part in a radial direction by using a position sensor disposed outside the casing; and a step (S106) of obtaining an estimated value of an internal clearance between the rotating part and the stationary part in the casing, based on a measured value detected by the position sensor.

In the above method (12), since the position sensor for detecting the relative position of the casing to the rotating part in the radial direction is disposed outside the casing of the rotary machine, installation or management of the position sensor can be facilitated compared to the case where the position sensor is disposed inside the casing. Further, in the above method (12), since the estimated value of the internal clearance of the rotary machine is obtained based on the detection result of the above-described relative position by the position sensor, the internal clearance of the rotary machine can appropriately be monitored based on the estimated value. Whereby, for example, it is possible to effectively suppress the contact between the rotating part and the stationary part. Accordingly, with the above method (12), it is possible to achieve both easy installation and management of the position sensor and appropriate monitoring of the internal clearance of the rotary machine.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Steam turbine
2 Outer casing
2A Casing upper half portion
2B Casing lower half portion
2*a* Axial end surface
3A Upper flange portion
3B Lower flange portion
4 Support leg portion
8 Support pedestal
10 Foundation
12 Rotor
14 Rotor blade
16 Inner casing
18 Blade ring
19 Stator vane
20 Dummy ring
22 Inner gland part
24 Outer gland part
26 Steam chamber
28 Gland packing
30 Position sensor
30A Upper sensor
30B Lower sensor
32 Support member
40 State quantity sensor
50 Processing unit
52 Sensor data acquisition unit
54 Estimation unit
56 Determination unit
58 Control unit
60 Temperature control part
62 Heating part
64 Cooling part
90 Monitoring/control device
100 Rotary machine equipment
O Central axis

The invention claimed is:

1. A monitoring device for monitoring a clearance of a rotary machine including a casing for housing a rotating part and a stationary part, comprising:

at least one position sensor disposed outside the casing and configured to detect a relative position of the casing to the rotating part in a radial direction; and an estimation unit configured to obtain an estimated value of an internal clearance between the rotating part and the stationary part in the casing, based on a measured value detected by the at least one position sensor, wherein the at least one position sensor is supported on the casing or a member mounted to the casing and disposed so as to face the rotating part at a position outside the casing in an axial direction of the rotary machine and is configured to detect a radial distance between the at least one position sensor and the rotating part.

2. The monitoring device for the rotary machine according to claim 1, wherein the rotary machine includes an outer gland part disposed at an end of the casing in an axial direction, and wherein the at least one position sensor is further supported by the outer gland part.

3. The monitoring device for the rotary machine according to claim 1, wherein the at least one position sensor includes a pair of position sensors disposed on both sides of the casing in an axial direction.

4. The monitoring device for the rotary machine according to claim 1, wherein the estimation unit is configured to calculate the estimated value of the internal clearance, based on a state quantity indicating a state of the rotary machine and the measured value obtained by the at least one position sensor.

5. The monitoring device for the rotary machine according to claim 4, wherein the estimation unit is configured to acquire the estimated value of the internal clearance by calculating a provisional estimated value of the internal clearance and a provisional estimated value of the relative position from the state quantity indicating the state of the rotary machine, and adding a difference between the measured value obtained by the at least one position sensor and the provisional estimated value of the relative position to the provisional estimated value of the internal clearance.

6. The monitoring device for the rotary machine according to claim 1, wherein the estimation unit is configured to calculate the estimated value of the internal clearance with an estimation model that uses a state quantity indicating a state of the rotary machine and the measured value obtained by the at least one position sensor as inputs.

7. The monitoring device for the rotary machine according to claim 1, comprising:

a determination unit configured to determine whether to change a shape or a position of the casing, based on the estimated value of the internal clearance.

8. A rotary machine equipment, comprising:

the rotary machine including the casing for housing the rotating part and the stationary part; and the monitoring device according to claim 1 for monitoring the clearance of the rotary machine.

9. The rotary machine equipment according to claim 8, wherein the monitoring device includes a determination unit configured to determine whether to change a shape or a position of the casing, based on the estimated value of the internal clearance, and wherein the rotary machine equipment comprises a control unit configured to change the shape or the position of the casing such that the internal clearance falls within a specified range, when the determination unit determines that the shape or the position of the casing needs to be changed.

10. The rotary machine equipment according to claim 9, wherein the control unit is configured to control a temperature control part for heating or cooling at least a portion of the casing or a support pedestal for supporting the casing, such that the internal clearance falls within the specified range.

11. The monitoring device for the rotary machine according to claim 1, wherein the at least one position sensor is supported on an axial end surface of the casing.

12. A computer-readable storage medium for storing a monitoring program for monitoring a clearance of a rotary machine including a casing for housing a rotating part and a stationary part, the monitoring program being configured to cause a computer to:

receive a signal indicating a measured value of a relative position of the casing to the rotating part in a radial direction detected by a position sensor disposed outside the casing; and obtain an estimated value of an internal clearance between the rotating part and the stationary part in the casing, based on the measured value, wherein the signal indicates a radial distance between the position sensor and the rotating part, the position sensor being supported on the casing or a member mounted to the casing and being disposed so as to face the rotating part at a position outside the casing in an axial direction of the rotary machine.

13. A monitoring method for monitoring a clearance of a rotary machine including a casing for housing a rotating part and a stationary part, comprising:

detecting a relative position of the casing to the rotating part in a radial direction by using a position sensor disposed outside the casing; and obtaining an estimated value of an internal clearance between the rotating part and the stationary part in the casing, based on a measured value detected by the position sensor, wherein the detecting of the relative position includes detecting a radial distance between the position sensor and the rotating part, the position sensor being supported on the casing or a member mounted to the casing and being disposed so as to face the rotating part at a position outside the casing in an axial direction of the rotary machine.

* * * * *